United States Patent [19]

Schramm

[11] 4,296,798
[45] Oct. 27, 1981

[54] INTEGRATED HOUSE

[76] Inventor: Horst Schramm, Schellingstr. 16,, D-6000 Frankfurt am Main, Fed. Rep. of Germany

[21] Appl. No.: 959,417

[22] Filed: Nov. 13, 1978

[30] Foreign Application Priority Data

Nov. 15, 1977 [DE] Fed. Rep. of Germany ....... 2750918

[51] Int. Cl.$^3$ ............................ F24D 5/10; F24J 3/02; E04B 1/70
[52] U.S. Cl. ........................................ 165/56; 52/303; 52/405; 126/431; 165/185
[58] Field of Search ....................... 165/485, 53, 54, 55, 165/56, 57, 135, 136; 52/171, 173, 303, 602, 405; 126/431, 429, 427

[56] References Cited

U.S. PATENT DOCUMENTS

| | | | |
|---|---|---|---|
| 1,428,056 | 9/1922 | Pegler | 52/171 |
| 2,013,367 | 9/1935 | Thompson | 52/303 |
| 2,559,869 | 7/1951 | Gay | 126/431 |
| 2,811,850 | 11/1957 | Clary | 52/303 |
| 3,154,821 | 11/1964 | Weker | 52/171 |
| 3,334,458 | 8/1967 | Leemhuis | 52/303 |
| 3,435,581 | 4/1969 | Ahlqvist | 52/405 |
| 3,442,058 | 5/1969 | Naslund et al. | 165/57 |
| 3,457,848 | 7/1969 | Pankow | 52/303 |
| 3,475,529 | 10/1969 | Lacy | 52/602 |
| 3,633,659 | 1/1972 | Chlsson | 165/56 |
| 3,980,130 | 9/1976 | Thomason et al. | 126/427 |
| 3,991,937 | 11/1976 | Heilemann | 165/56 |
| 4,000,850 | 1/1977 | Diggs | 165/485 |
| 4,015,387 | 4/1977 | Tillie | 52/405 |
| 4,051,891 | 10/1977 | Harrison | 126/431 |
| 4,051,999 | 10/1977 | Granger et al. | 126/431 |
| 4,069,809 | 1/1978 | Strand | 126/431 |
| 4,069,973 | 1/1978 | Edwards | 165/56 |
| 4,147,300 | 4/1979 | Milburn | 126/427 |

Primary Examiner—Daniel J. O'Connor
Attorney, Agent, or Firm—Hill, Van Santen, Steadman, Chiara & Simpson

[57] ABSTRACT

A house or other like structure is constructed out or ribbed concrete panels. In the outer walls a single ribbed panel is used with a thick overlying layer of insulation followed by a facade covering. Windows are double-paned and are installed in a concrete frame which is formed as part of the outside wall. The interior walls and floors have two ribbed panels facing one another, thus forming interpositional spaces between the ribs. By careful arrangement and interlocking of the ribbed panels, circulation of air is made possible through air circuits formed by the interpositional spaces, thus allowing for ventilation and, if the air is heated or cooled, enabling the interior walls to act as heat exchange surfaces.

8 Claims, 18 Drawing Figures

INTEGRATED HOUSE

BACKGROUND OF THE INVENTION

1. Field of the Invention

This invention relates to an energy efficient dwelling constructed from pre-formed concrete component parts, and more particularly, to such a structure containing integrated air passageways also formed therefrom.

2. Description of the Prior Art

Until recently the housing industry was mired in traditional materials and methods of construction. Virtually the only change from the early agrarian days being the provision of finished lumber or bricks instead of logs or clay. It has only been recently, in response to the exploding costs of housing, that the use of pre-fabricated, structural components has attained popularity. For example, by using pre-cast concrete sections, a large building may rapidly be constructed.

Until recently there was also not much innovation regarding energy utilization in the home building art. However, with the end of cheap energy, there has been a great deal of activity in the area of heating and cooling. This increased interest logically follows the rising energy costs as heating and cooling usually comprises the greatest home energy expenditure.

Increasing the amount of heat energy transferred over a period of time may be effected by increasing the temperature differential and/or increasing the area over which the heat energy exchange takes place. Forced air heaters and coolers make use of an increased temperature differential but there is a comfort limit to the amount of air that can be advected through living spaces. Steam radiators make use of increased surface area but there are both aesthetic and cost limitations as to the optimal size of such metal radiators.

The modern house must meet the demands of a moderate price and also conserve energy. The largest energy use in a house is generally expended in the maintenance of a comfortable environment. The modern house thus must be well insulated and able to make use of efficient heat transfer devices, yet it must be constructed as inexpensively as possible. Traditional methods and materials are becoming too costly to meet these demands.

SUMMARY OF THE INVENTION

This invention has the primary object of combining good building value and energy conservation in the air conditioning. Under "good value", it is to be understood to mean that the method of construction is price-advantageous in comparison with conventional methods of construction. The question as to whether the energy conserving measures are of economical value does not enter into the calcuations to determine constructional cost savings. Thus, there are two separate objects of this invention. The first is to provide a less expensive method of construction. The second is to construct a building in an energy efficient manner.

These problems are solved according to this invention by means of an integrated house whose outer walls and at least some of its interior walls consist of two-sheet ribbed concrete slabs with interposing hollow spaces, said spaces containing, in the outer walls, insulating materials which render these walls intensively insulating and in the interior walls allow for integrated heat distribution, storage, and/or recovery systems.

The ribs in the interior walls are preferably arranged such that horizontal or vertical air circulation canals or channels are formed.

According to a preferred embodiment the outer walls have the ribbed concrete walls of the inner sheet arranged with very thick insulation plates, which are provided with grooves, in such a way that the insulation plates are held in place from three sides by the concrete used to cement the structure together. With the help of grooves a heavy facade lining is applied to the insulation plates, giving rise to a two-sheet or double wall. The insulation plates in this outer wall serve as an intensive heat insulation as well as for the acoustic separation of the facade lining and the ribbed concrete wall. In the interior walls the ribbed concrete slabs have either locking or opposing ribs which are so arranged that air circuits, for the purpose of heat and cold transfer with small temperature differences, can be generated in the spaces thus formed.

The facade lining is expediently fixed only to the insulation plates of the outer walls, so that no heat or cold bridges result.

The window frames consist of an inner portion formed as part of the ribbed concrete walls and an outer portion also formed with the ribbed walls but attached only by means of a metal support rod or strip. Together, as formed, the portions create a recess in which only a surrounding seal need be installed and the window casement hung in order to complete the window.

Preferably the window itself comprises two panes, the outer of these being held by hooks in the window frame when opened and by a surrounding elastic seal, preferably of rubber, when the window is closed. The seal presses into the outer portion so that the outer pane is held by the outer portion and the elastic seal simultaneously seals both the space between the panes and also the window casing. This construction is on the one hand cheap and on the other insures good insulation in the region of the window.

The ribbed concrete slabs of the interior walls, the room-dividing walls, are expediently designed such that the ribs in the middle story interlock and vertically-running air channels are formed in the spaces between them. In the lower and upper stories the ribs are arranged facing outwards, or the distance between them is chosen to be large enough to allow horizontal air currents there also, so that an entire interior wall channel system in which air can circulate is formed.

The interior walls advantageously contain flaps which can be closed and by means of which the channels can be connected up with an air-driven solar collector. The flaps allow air warmed in the solar collector to pass into the hollow spaces or channels in the interior walls. This can be effected by gravity or with the help of one or more blowers.

In a further modification of the invention, additional flaps are provided which provide a connection between at least some of the hollow spaces in the interior walls and the atmosphere, so that by using blowers or the effect of gravity outside air can be driven through the spaces to effect cooling. These additional flaps can be positioned in the cellar or in the attic, and open thereto, so that by means of opening the flaps and using windows provided in the cellar and attic, a gravity-driven air current is set up which flows through the cellar, up into the hollow spaces in the interior walls, and outside through the attic.

In an alternate embodiment the additional flaps can be designed as panel radiators to which heat is conveyed from an energy source, so that heat is transferred partly to the cellar and attic and partly to the hollow spaces, and gravity-driven air circuits are formed via which the heat is distributed to the whole house.

In another modification of the invention, the spaces in the interior walls are provided with connections, preferably closable, to a stable or suchlike room where heat accumulates.

According to a further alternate embodiment, the integrated house contains, in the interior walls, a conduit system comprising almost horizontally-running concreted hoses. A container for liquids is provided and connected at an upper and lower connection with the hoses. A middle connection to the container is linked with a liquid-driven solar collector. The liquid level in the container is maintained at a level higher than the upper connection. In operation, the liquid is pumped from the container to the solar collector. On completion of the solar heating operation, a gravity-driven liquid circuit from the container through the hose system results. Hoses can also be concreted into the ribs in the interior walls for additional heating.

According to a further development of the invention, vertically-running metal sheets are introduced into one or more of the hollow spaces in the interior walls. The sheets are in contact with at the most one of the two opposing walls and being separated from the other wall by strip-like spacers of an insulating material. Thereby ducts are formed through which fresh air can be guided in an opposing current past exhaust air, thus taking up heat from the exhaust air. The ducts carrying the fresh air are expediently provided with absorbent surfaces, kept moist, which means that the fresh air is moistened and the energy of evaporation is drawn off from the exhaust air.

In order to avoid the danger of ice formation in the exhaust air ducts in winter, the fresh air is guided, before reaching the ducts, through a ground contact stage where it is pre-warmed and pre-moistened. At the upper exit from the ducts a flap is expediently installed which enables direct discharge of the exhaust air without its running through the exhaust ducts.

Various other objects, advantages and features of the present invention will become readily apparent from the ensuing detailed description and the novel features will be particularly pointed out in the appended claims.

DESCRIPTION OF THE PREFERRED EMBODIMENTS

Figure 1:
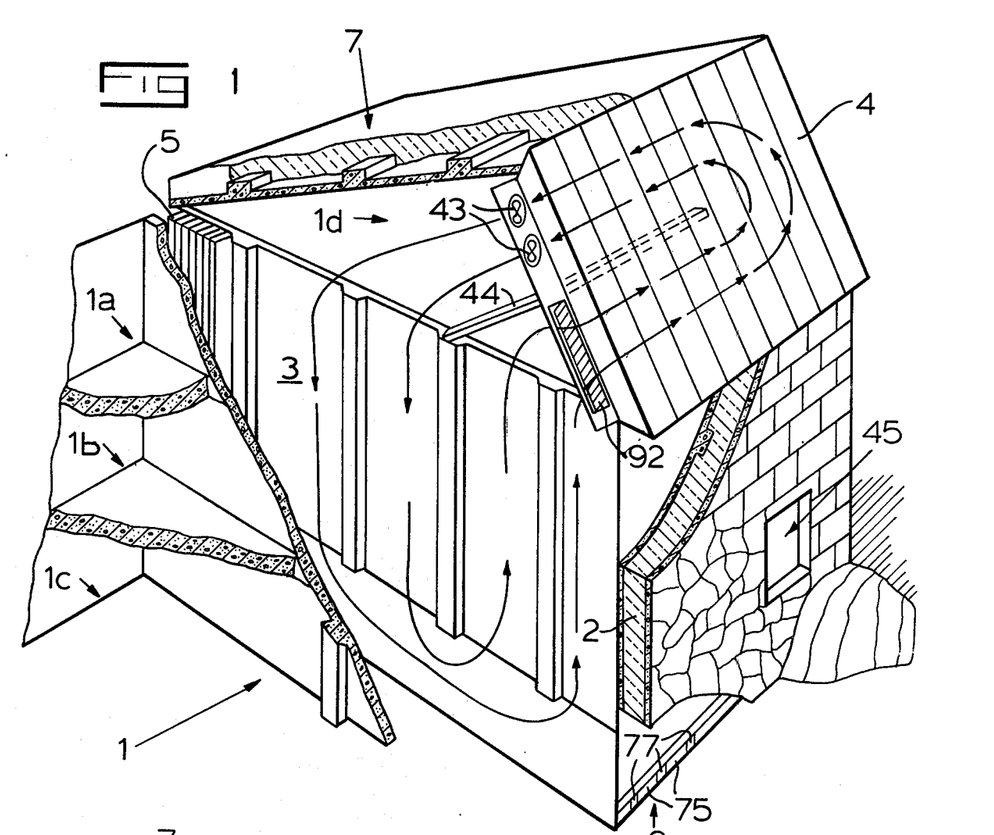
FIG. 1 is a perspective view with parts broken away showing an embodiment of the invention.
Figure 1A:
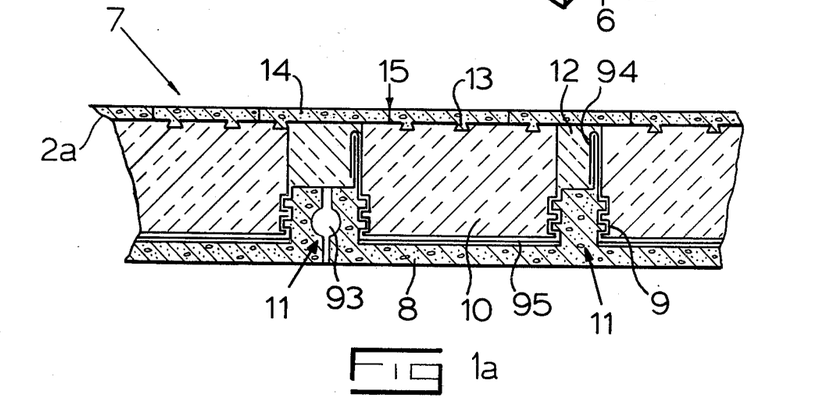
FIG. 1a is a fragmentary vertical cross-sectional view of an intensively insulating two-sheet structure.

The integrated house 1 as shown in FIG. 1 has a supporting structure consisting of intensively insulating exterior walls 2, of which only one is shown, forming an outside shell, a transfer system 3 for air heated in a combined solar heat collector system 4, an air heat exchanger 5, a ground contact stage 6 for fresh air and an intensively insulating roof 7. The house 1 has two stories 1a, 1b, a cellar 1c, and an attic 1d. The most effective measure for energy conservation consists in the use of the highly insulating outer walls 2. The walls can be made preferably on the building site with the help of a tilting table, as described in my previously filed Pat. application, Ser. No. 851,420, filed Nov. 14, 1977. As shown in FIG. 1a a wall face 8 of approximately 5 cm thickness and usually reinforced is concreted. Thick insulation blocks or plates 10, preferably of rigid foam plastic, e.g., Styropor, and provided with grooves 9 are laid on the still fluid, soft concrete and weighted such that on shaking, the concrete wash penetrates into the grooves 9. Between the approximately 25 cm thick insulation plates 10 spaces are left which can be filled to a depth of approximately 15 cm with concrete. In so doing concrete also penetrates into the lateral grooves 9 in the insulation plate 10, so that the insulation plate 10 is held from three sides. Ribs 11 are thus formed, being reinforced and dimensioned as according to static requirements. The insulation can then be completed. This can be brought about by means of insulation plates 12, cut to the required width, which are provided with grooves (not shown) similar to grooves 9 and which are pressed into the still soft ribs 11. Any spaces still present between the plates 10 and 12 can be filled with rock wool or other finely granulated insulating material.

The insulation plates 10 are also provided with grooves 13 at the top. A facade lining 14 can now be applied, which penetrates on application into the grooves 13 and is joined in a form-locking manner with the insulation plates 10. The facade lining 14 is preferably prepared with cement as a binder, and possibly with additives which facilitate vapor diffusion. In order to exclude the possibility of cracks, vertical and horizontal (not shown) incisions 15 are made in the not-yet hardened facade lining 14. The horizontal incisions are preferably sloped downwards from interior to exterior in order to divert rain water. The incisions 15 can be of arbitrary design with the single limitation that the continuous surfaces formed are not too large. Otherwise, they can contribute to a facade design which is rich in variety (see FIG. 1).

The insulating plates 10 consist of rigid foam plastic having a bulk modulus as small as possible. Requirements as to firmness are not great. Acoustically they represent a separation of the facade lining 14 and the ribbed concrete wall 8. A two-sheet outer wall 2a results which despite its light weight is, with respect to sound reduction, superior to equally thick and much heavier single sheet walls. The heat insulation lies at 0.2 W/m²K, a value scarcely to be reached by other means. Under certain circumstances it can be advantageous to provide hollow spaces 16 in an outer wall 2b (shown in FIG. 5). Acoustically this has two different affects. On the one hand, a more advantageous compressible cavity is formed giving greater sound reduction. However, firmer foam plastic having a correspondingly higher bulk modulus must be used due to the deterioration due to stress in the connections to the ribbed wall. This tends to increase acoustic penetration.

Figure 5:
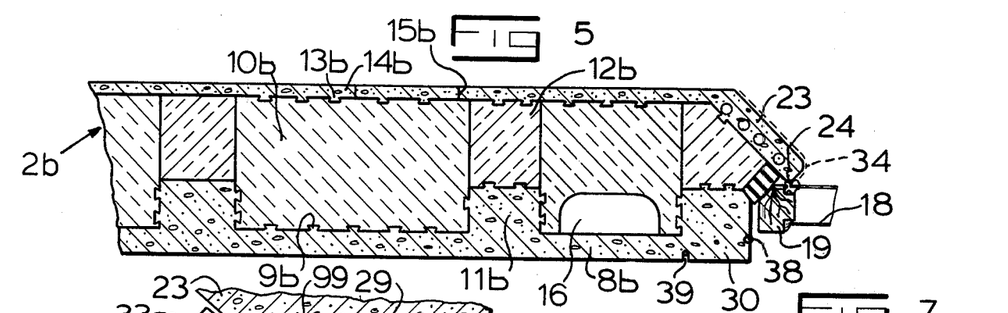
FIG. 5 is a view similar to FIG. 1a but showing a fragment of the outer wall having a portion of a window opening.
Figure 6:
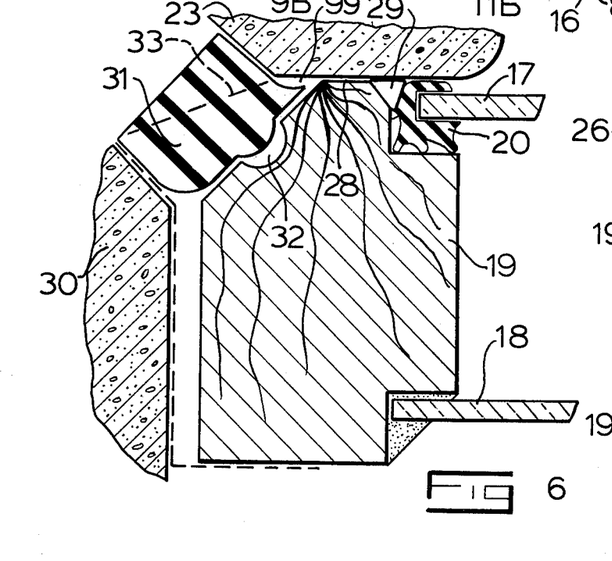
FIG. 6 is a view similar to FIG. 5 showing a portion of the window opening in detail according to the present invention.
Figure 7:
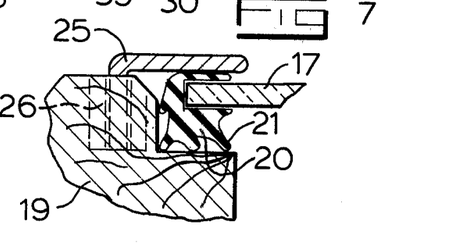
FIG. 7 is a fragmentary horizontal cross-sectional view in detail of a window frame according to this invention.
Figure 8:
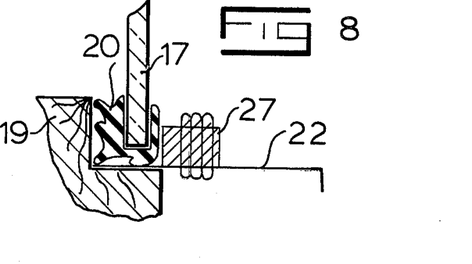
FIG. 8 is a vertical cross-sectional view in detail showing a lower portion of a window frame according to the present invention.
Figure 9:
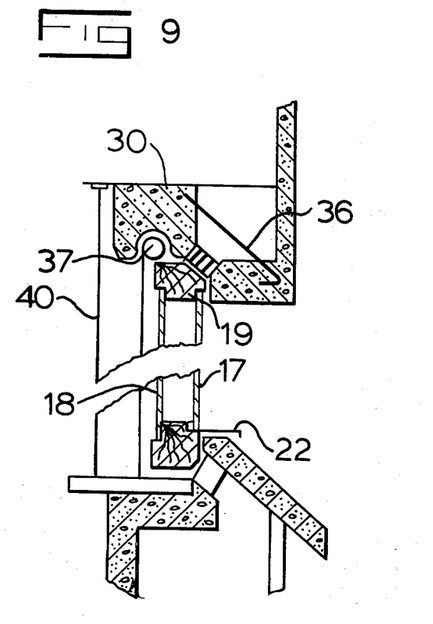
FIG. 9 is a partially broken vertical cross-sectional view showing the upper and lower portions of a window opening according to the present invention.
Figure 10:
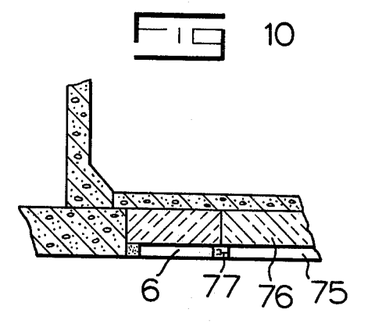
FIG. 10 is a fragmentary vertical cross-sectional view through a cellar floor according to the present invention.

The roof 7 is made in a similar way (see FIGS. 1, 1a, 5). The first face 8 is made of waterproof concrete. Then water-tight and vapor-tight foils 95 will be laid on face 8 and on these foils the insulating plates 10, which have at their sides grooves 9. The foils 95 are laid at the sides of the plates 10, in a manner that foils and concrete will penetrate the grooves 9, when the ribs 11 are concreted. The plates 10 are now held from two sides and cannot float up when rain water penetrates between foils 95 and plates 10. After concreting the ribs 11 the foils 95 are folded to a waterproof construction 94 and the insulation is rendered complete by ribs 11. Now the frost-proof lining 14 can be applied, which is held by grooves 13. Incisions 15 are made. The edge of a slab is built as a rib with a big groove 93. After erection of the plates, groove 93 will be filled with concrete, constituting a shear-resisting connection and joining the slabs. The foils 95 may now be folded in the described manner, and the insulation and the lining 14 can be completed. The loading of the insulating plates 10 at the roof is less than at the walls. It is possible to take very cheap material, e.g., Styropor with a weight of approximately 10 to 15 kg/m³. The thickness of the plates is not limited by the loss of living space. The most economic thickness may be up to 50 cm. With flat roofs the grooves 13 are not necessary. The lining 14 may be built as a layer of gravel or as a promenade roof.

The described roof construction has a negative water insulation with the advantage that there are no problems of steam or water vapor pressure. The insulating material must be non-hygroscopic and frost-proof.

The success of the highly insulating wall 2a described is also dependent on perfect integration of the windows. This integration is shown more clearly in FIGS. 5 to 9. Here too the aim is a combination of quality and moderate price. In achieving this, consideration regarding the optimal distance between outer and inner window panes 17 and 18 respectively, the structural integrity of the window frame, sealing of water-tightness, as well as protection against heat radiation in the dark, all play decisive roles. The use of triple-pane windows, on the contrary, is less useful, since the optimal inter-pane distance cannot be kept here, and the increased reflection attenuation of the light passing through necessitates larger windows, meaning that the insulation gained by the third window is partly cancelled out.

A window casement consists of a frame 19, preferably of wood, onto which the inner pane 18 is firmly mounted. The outer pane 17, which should be spaced some 55 mm from the inner pane 18, is provided with a surrounding seal 20. The seal 20 has flexible seal lips 21 being so designed that the outer pane 17, when installed, can be moved approximately 1 mm in the direction of pane 18. On the underside a metal water bar 22 is so attached that it penetrates between the frame 19 and the seal 20. A window is surrounded by an outer portion 23, which is cemented together with the facade lining 14, and an inner portion 30, which is part of the wall face 8 and is formed by one of the ribs 11. At the bottom of a window, the outer portion 23 has a recess 24 which is designed so that the water bar 22 can extend from the frame 19 and drain the entire wetted surface of the window. The outer pane 17 is held at the sides by hooks 25 for which recesses (not shown) are similarly provided in the outer portion 23 and which prevent the hook 25 from bumping against the outer portion 23. The hooks 25 are affixed to the frame 19 with the help of a helicoil thread 26. The helicoil thread 26 makes exact adjustment possible as well as allowing repeated turning. Fixed to the water bar 22 there are knobs 27 which firmly hold the outer pane 17 at the bottom of the frame 19. When a window is open the hooks 25 can be turned away and the pane 17 tilted for purposes of cleaning. When closing a window the seal 20 presses against the outer portion 23. It thus represents a first soft seal which is interrupted only at the bottom of a window. The panes 17 are now held not only by the hooks 25 but also by the surrounding outer portion 23.

Adjacent to seal 20 there is a seal formed as at 28 which is formed by the frame 19 abutting as exactly as possible on the outer portion 23. In between there is a first turbulence chamber 29. Outer and inner portions 23, 30 are separated by a thick surrounding seal 31, preferably made of sponge rubber. When closing a window the seal 31 is severely compressed and by so doing it is pushed, especially on the free swinging side, into a second turbulence chamber 99, which must be large enough for this purpose. One or more grooves 32 in the frame 19 can serve towards further improvement in the sealing. The seal 31 can easily be replaced. If it is square in cross-section, it can be turned through 90° each time a side is worn. The seal 31 consists of a material which is also a good heat insulator. It therefore serves as good side protection.

The outer and inner portions 23 and 30 are parts of an intensively insulating wall 2b. They are prepared by laying an inner window form 33 and on top of this an outer form 34 (broken line FIG. 5) onto the casting table used for preparing the whole wall, and then concreted in the manner described. The otherwise separately constructed, normal window frames, which are always difficult to fit so as to be completely water-tight, are superfluous, as they are formed by the wall. For reasons of structural strength the outer and inner portions 23, 30 are connected by means of a piece of galvanized iron 36 which is inserted at the time of concreting the wall.

sluggishness or lag time is considerably less than for example that of floor or ceiling heating; it can be well regulated. The air-solar heating system shown in FIG. 1 necessitates a solar collector which can also be operated with air.

Figure 13:
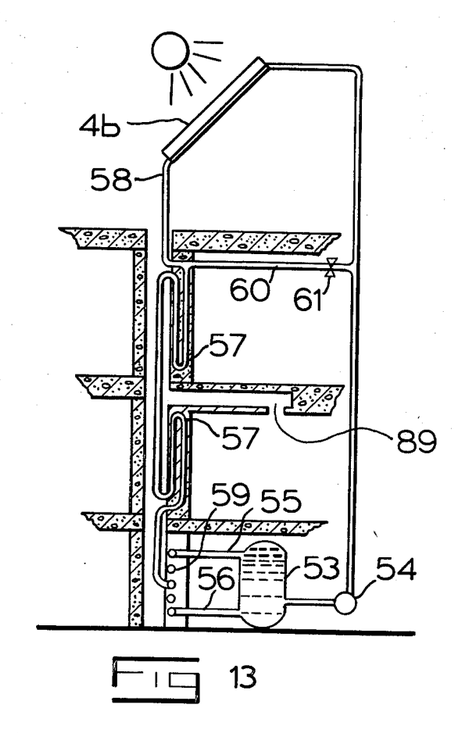
FIG. 13 is a partial vertical cross-sectional view in schematic of the present invention.
Figure 14:
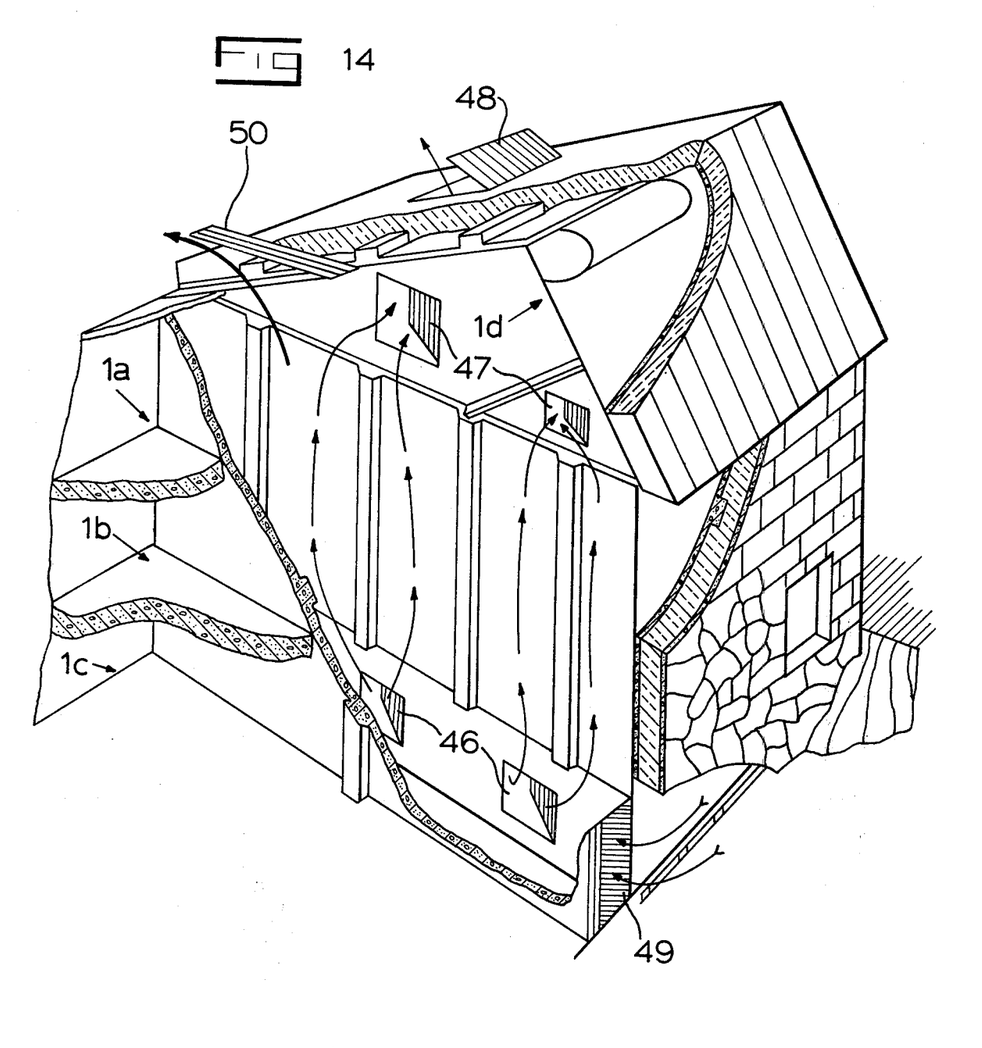
FIG. 14 is a view similar to FIG. 1.

The hollow walls also make the setting up of a simple system possible for distributing the energy taken up by a liquid-operated collector to the house (FIG. 13). A hose system 59 is cemented into the hollow wall of the cellar, said system being connected by pipes 55, 56 to a container 53. The hoses in the system 59 run almost horizontally, having a certain inclination to assure that any air bubbles occurring in them pass to the container 53. During the solar heating operation a pump 54 pumps water into the collector 4b where it is warmed. The water passes from there into hoses 57 which are concreted into the hollow walls of the ground and first floors 1b, 1a. In order to avoid them being damaged, the hoses 57 can be concreted vertically into the hollow walls such that they are as far as possible from the wall face facing into the room (see FIG. 2). They are built into the ribs adjacent to the upwards-directed parts of the air currents 51 in order to maintain these same currents. From the hoses 57 the water passes to the middle of the hose system 59 and from there through the pipes 55, 56 back into the container 53. In the hose systems 57, 59 part of the heat taken up is given off and the rest reaches the container 53, which is slowly heated and itself starts to give off heat.

When the solar heating operation is over, pump 54 switches off and the water contained in the solar collector 4b flows into container 53. In this way losses due to sluggishness, (pre-heating the water remaining in the lines), and the danger of freezing are eliminated. For reasons of corrosion a plastic collector is preferable, which must be so designed that all of the water can flow out. When the solar heating operaiton has stopped, the hollow walls, warmed from system 59, maintain the air circulation current 51. In so doing they are cooled down and now begin to draw heat in a gravity operation from container 53, so that when there is no sun the container 53 is cooled down as quickly as possible. To accelerate this cooling it is of course also possible, with the help of a transverse connection 60 that is closed during solar operation by a solenoid valve 61, to pump water through the hose system 57.

Figure 15:
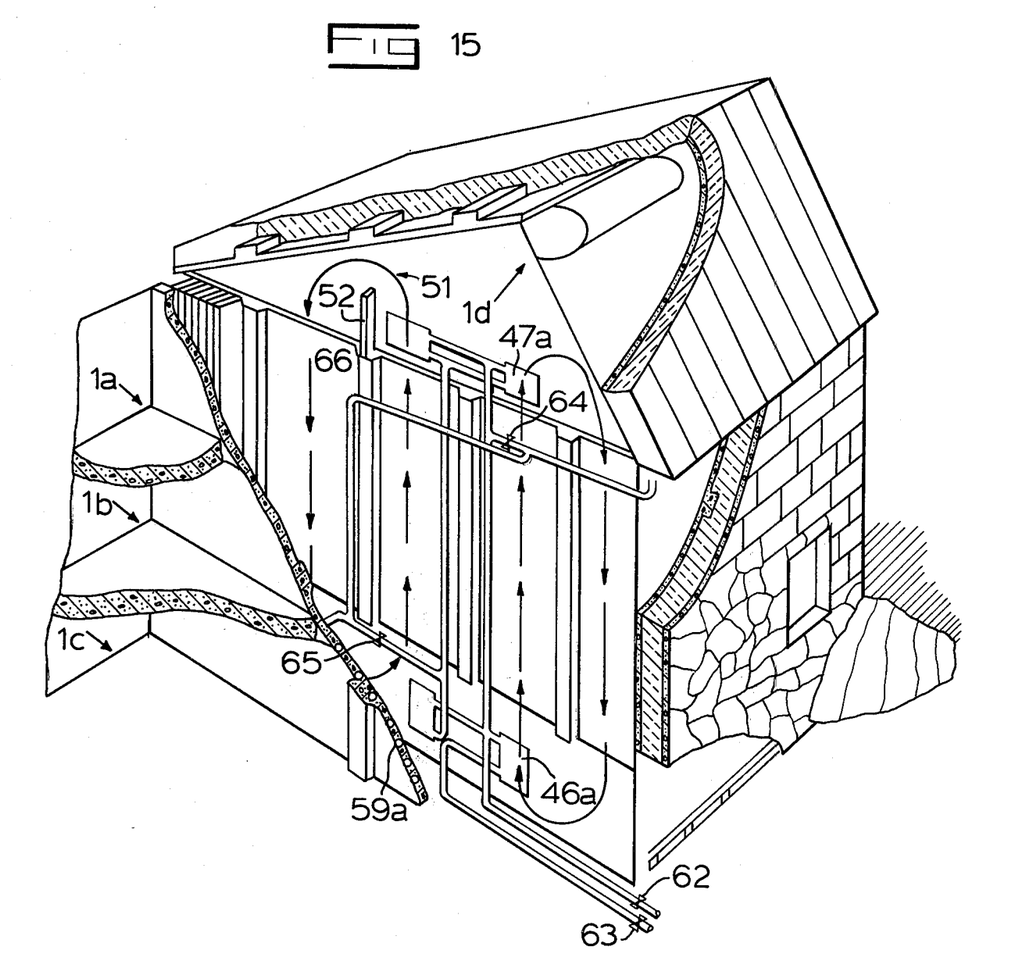
FIG. 15 is a view similar to FIG. 1.
Figure 16:
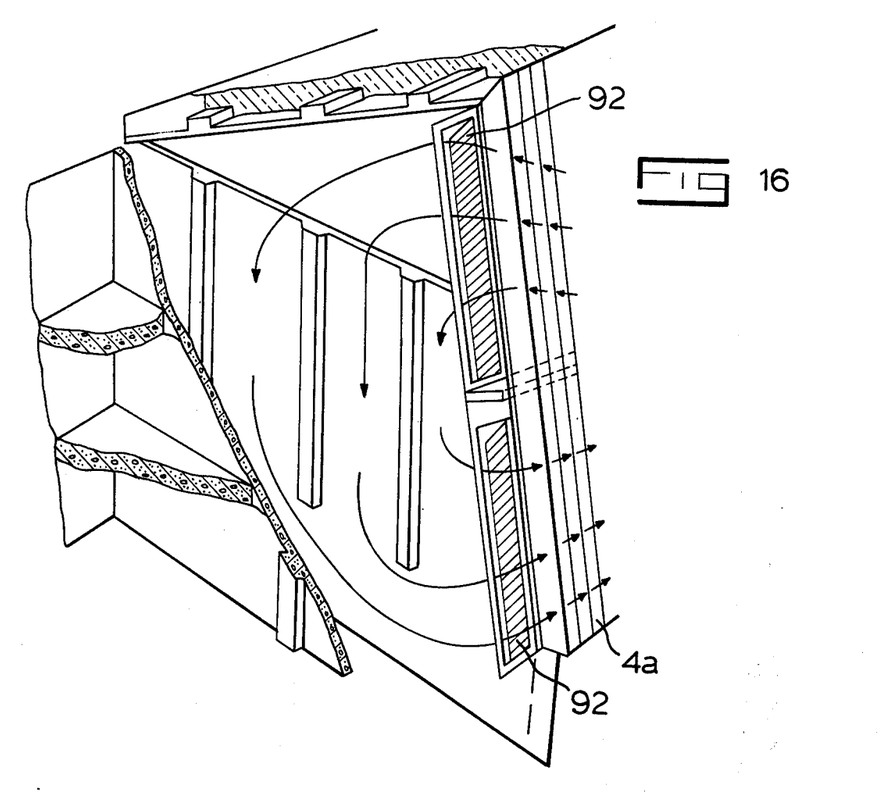
FIG. 16 is a partial perspective view with parts broken away showing an embodiment of the present invention.

The work of the hose system 57 can also be taken over by a separate heating system, as is shown in FIG. 15. At the start of solar heating the out-flow and return course of the separate heating system are blocked by valves 62, 63 and instead a lead from the collector 4a and a discharge 63a to system 59a opened via opening the valves 64, 65. The water coming from the collector 4a now runs first through panel radiators 46, 47 before going into system 59a through open valve 65. Since the radiators should not be emptied, on completion of solar heating, valves 64 and 65 are closed and then valves 62 and 63 may be opened to reconnect the separate heating system. The water in the collector 4a then runs out through a by-pass pipe 66 which has a high through-flow resistance.

Figure 17:
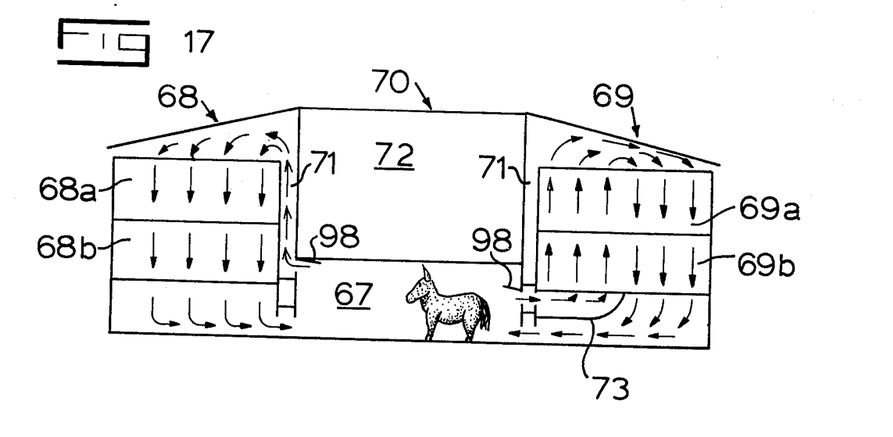
FIG. 17 is a vertical cross-sectional view of an alternate embodiment of the present invention.

The significant advantage of having hollow walls is that they provide large heat exchange surfaces at no additional cost, thus making heating and cooling possible with very small temperature differences. This also makes it possible to use heat of decomposition, whose temperature is only slightly above room temperature, for heating purposes. FIG. 17 shows a section through such a residential set-up. There are two attached houses 68, 69 each having their rear side adjacent to a middle building 70 in whose lowest floor there is a stable 67. The middle building 70 is separated by intermediate spaces 71, 71 from the living quarters 68a, 68b, 69a, 69b of houses 68, 69. The intermediate spaces 71, 71 are, for acoustic reasons, of adequate size (approximately 50 cm) and contain acoustic low-pass filters not described in more detail here. The heat given off by the animals, (a cow gives off about 1,000 W), generates a gravity-driven air current through the hollow walls of houses 68 and 69. This air current can be blocked by flaps 98, 98. The upwards-directed part can run through the intermediate space 71 as in house 68. A separating unit 73 can, however, also be cemented into the hollow cellar wall, which also here permits horizontally-directed air currents, so that both the upwards and also the downwards directed currents run into the hollow walls, as is shown in house 69. In order to avoid sooting, which can occur due to the ammonia-containing gases, the hollow walls are provided at the time of concreting with plastic foil or provided with suitable protective coats before encasement. The concrete can in addition be provided with suitable additives.

The room 72 above the stable 67 can be used for commercial purposes. With the help of the resulting combination of living, agriculture, and commercial possibilities, virtually self-sufficient settlements can be set up if extractable gases, such as methane, from the stable dung and human feces can be converted into electricity and thus a state of complete self-sufficiency in energy is achieved.

The heat conservation and air conditioning measures described above are rendered complete by an integrated air treatment system in the hollow walls and cellar floor (see FIGS. 1, 10, 11, and 12). The lower cellar floor insulation 76, consisting of approximately 10 cm thick rigid foam plates, is laid in such a way on mortar strips 77 that air canals 75 of about 3 cm height are formed between the plates and the earth; fresh air is sucked in through these canals. In their entirety the air canals 75 represent a ground contact stage 6. In summer the ground is colder than the outside air and the fresh air is cooled. In so doing water vapor condensation and elimination of humidity can result, i.e., the air is dried. Both phenomena are desirable air-conditioning measures.

Figures 2, 3, 4:
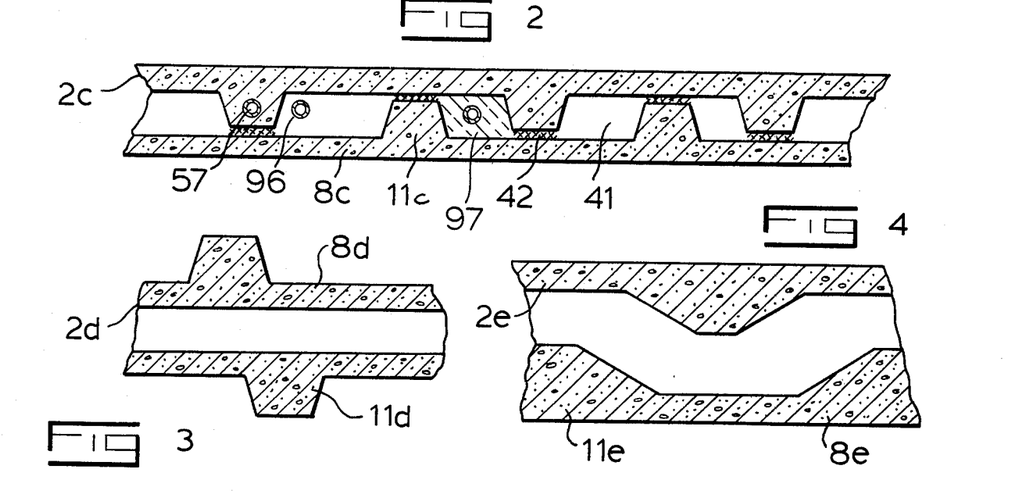
FIG. 2 is a fragmentary horizontal cross-sectional view of an outer wall in accordance with an alternate embodiment of the present invention.
FIG. 3 is a fragmentary horizontal cross-sectional view of an interior wall in accordance with an alternate embodiment of the present invention.
FIG. 4 is a view similar to FIG. 3 but showing an alternate embodiment of the invention.

In winter the ground is warmer than the outside air and the fresh air is warmed. If the ground is adequately damp, the air also will take up water. In winter these contrary effects are desirable. With the help of the exhaust air the fresh air is now pre-warmed in a heat exchanger 5. The latter consists of long metal sheets 78 (FIG. 11) which extend vertically in the hollow spaces 41 (FIG. 2). The sheets 78 are not quite as broad as the spaces 41 and so do not come into simultaneous contact with two opposing ribbed walls, which would result in the formation of sound bridges. The sheets 78 are held apart by strips 81 of an insulating material, e.g., hard foam.

Figure 11:
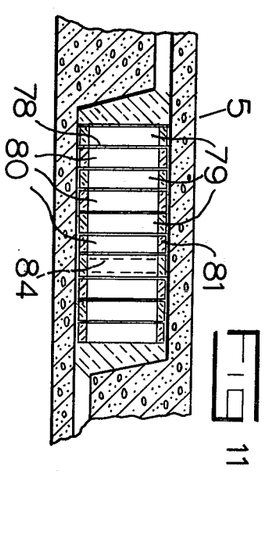
FIG. 11 is a fragmentary horizontal cross-sectional view of a hollow interior wall having an air-heat exchanger integrated therein according to the present invention.
Figure 12:
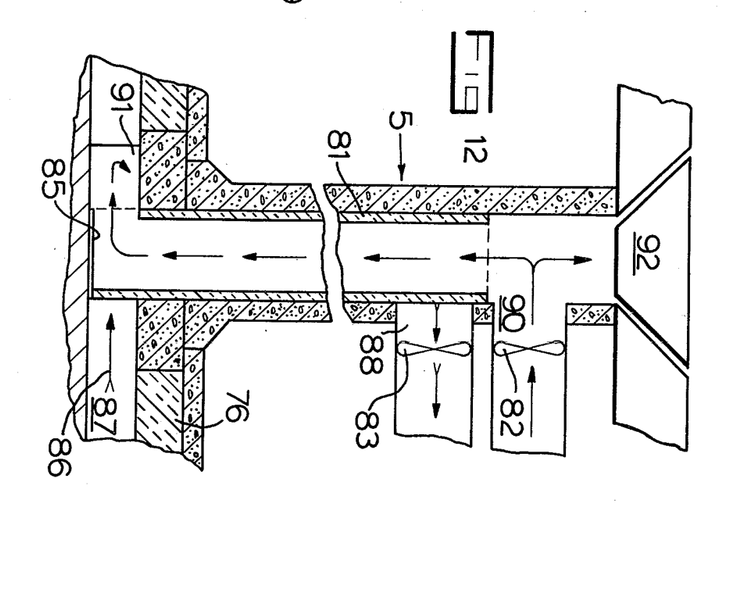
FIG. 12 is a vertical section on line 12—12, FIG. 11.

Fresh air canals 79 are formed in which fresh air from the ground contact stage 6 is guided upwards. Exhaust canals 80 in which the exhaust air is guided from the top downwards are also formed. Icing up in the fresh air canals is prevented by the pre-heating in the ground contact stage 6. The drive for the currents is effected preferably by means of an exhaust blower 82 and a fresh air blower 83, whose speeds of rotation can be regulated so that the pressure within the house is equal to the external pressure in that opening of doors or windows does not affect the pressure relationship. The sheets 78 can be provided on the fresh air side with absorbent textile material 84 which soaks up water from a container above, not shown, and gives up this water to the fresh air in order to further moisten same. The energy of evaporation in so doing is drawn from the exhaust air.

On the lower side the sheets 78 reach down to the ground, where they rest on a mortar layer 85 which is previous to water. In both the fresh air canals 79 and in the exhaust air canals 80 there can be water of condensation, which runs down and seeps into the ground. The sheets 78 in the fresh air canals 79 end at the bottom and top such that the fresh air 86 as shown by the feathered arrow, enters from a transverse connection 87 joining canals 75 and leaves at the top via a fresh air canal 88. From there it is directed into the hollow wall system, where it is further heated in the winter, and passes finally via canals 89 designed as acoustic low-pass filters, and cemented into the intermediate floor, into the separate rooms (FIG. 13). As there are plenty of hollow wall canals available, canals 89 can open into same. Since the fresh air is guided through the hollow wall not only can the otherwise necessary special air canals be eliminated but the fresh air also supports the heat transfer from the hollow wall into the rooms. The exhaust air is guided from the humid rooms in specially provided canals, which under consideration of the acoustic requirements can also be hollow wall canals, into an exhaust air canal 90 (FIG. 12) in the attic. From there it passes in winter through the heat exchanger 5 and is directed through an outlet 91 into the open. In summer a flap 92 in the attic is opened and the exhaust air passes into the open without going through the heat exchanger 5. In this case the exhaust air canals 90 operate as normal air vents, since the flow resistance due to the heat exchanger 5 is eliminated. The exhaust air blower 82 can thus be switched off.

As a result of the ground contact stage 6, the earth under the house serves as a storage means for storing summer heat for the winter and winter cold for the summer. In order to avoid prematurely using the cold storage, the fresh air blower 83 is switched off in early summer when there is not yet any need for air drying and the windows are used for airing. Possible need for cooling can be covered by the hollow wall cooling. Since heat is supplied and removed as according to season there are no long term temperature changes in the adjacent earth.

While I have disclosed an exemplary structure to illustrate the principles of the invention, it should be understood that I wish to embody within the scope of the patent warranted hereon all such modifications as reasonably and properly come within the scope of my contribution to the art.

I claim as my invention:

1. An integrated house comprising:
a plurality of outer walls, forming an outside shell, each comprising:
  a ribbed concrete slab;
  a layer of insulation material abutting said ribbed concrete slab on one side thereof;
  a facade lining covering said layer of insulation material;
a plurality of interior walls arranged in an interlocking manner interiorly of said outside shell and comprising:
  two ribbed, concrete slabs, interpositioned in order to have hollow spaces therebetween, said interior walls and floors arranged in order to integrate said hollow spaces and form air circuits; and
a plurality of vertically running metal sheets disposed within at least one of said hollow spaces of said interior walls, said sheets being in contact with at most one of said two ribbed, concrete slabs and being separated from another by strip-like spacers of an insulating material for forming adjacent fresh air and exhaust channels through which fresh air can be guided in an opposing current passed exhaust air for obtaining heat transfer from said exhaust air,
whereby an intensively insulated outer structure is formed by said outside shell which contains an inner structure having an integrated air distribution system formed by and as an integral part of said interior walls.

2. An integrated house as described in claim 1 wherein flaps are provided connecting said hollow spaces to a stable or such like room where heat accumulates.

3. An integrated house as described in claim 1 wherein said fresh air canals are provided with absorbant surfaces, which may be kept moist whereby the fresh air may be moistened with the energy of evaporation drawn off from the exhaust air.

4. An integrated house as described in claim 1 wherein a ground contact stage is provided whereby the fresh air is pre-warmed and pre-moistened before introduction into said fresh air canals in order to avoid the danger of ice formation.

5. An integrated house as described in claim 1 wherein a flap is provided at an upper exit from exhaust canals in order to enable direct discharge of the exhaust air without passage through said exhaust canals.

6. An integrated house comprising:
an intensively insulated outside shell comprising:
  intensively insulated exterior walls;
  an insulated roof attached to and disposed above said exterior walls;
  an insulated cellar attached to and disposed below said exterior walls; and
  at least one window located on said exterior walls and each of which comprise:
    two panes;
    a window frame spacing apart and holding said panes; and
    an inner and outer portion formed by said exterior wall and receiving said window frame in sealed-together relationship; and
a plurality of connected interior walls and floors, forming a structure which is attached to and surrounded by said outer shell, and comprising:
  two ribbed, pre-formed concrete slabs, interpositioned in order to have hollow spaces therebetween, said interior walls and floors arranged in order to integrate said hollow spaces and form air circuits;
a heating means connected to said air circuits; and
a cooling means connected to said air circuits,
whereby heat may be transferred to and taken from said interior walls and floors via air passing through said interior walls and floors in said air circuit thus heating or cooling said integrated house.

7. An integrated house as described in claim 6 wherein said heating means comprises an air-driven solar collector.

8. An integrated house as described in claim 6 wherein said cooling means comprises a ground contact stage.

* * * * *